(12) United States Patent
Chien et al.

(10) Patent No.: US 11,048,954 B2
(45) Date of Patent: Jun. 29, 2021

(54) FINGERPRINT ENROLLMENT METHOD AND ELECTRONIC DEVICE USING THE FINGERPRINT ENROLLMENT METHOD

(71) Applicant: ELAN MICROELECTRONICS CORPORATION, HsinChu (TW)

(72) Inventors: Chun Chien, Hsinchu (TW); Li-Wei Lin, Yilan County (TW); Yen-Cheng Lin, Taipei (TW)

(73) Assignee: ELAN MICROELECTRONICS CORPORATION, Hsinchu (TW)

( * ) Notice: Subject to any disclaimer, the term of this patent is extended or adjusted under 35 U.S.C. 154(b) by 177 days.

(21) Appl. No.: 16/407,110

(22) Filed: May 8, 2019

(65) Prior Publication Data

US 2019/0362172 A1 Nov. 28, 2019

Related U.S. Application Data

(60) Provisional application No. 62/674,631, filed on May 22, 2018, provisional application No. 62/696,862, filed on Jul. 12, 2018.

(30) Foreign Application Priority Data

Sep. 3, 2018 (TW) .................. 107130882
Oct. 25, 2018 (TW) .................. 107137727

(51) Int. Cl.
*G06K 9/00* (2006.01)
(52) U.S. Cl.
CPC ..... *G06K 9/00926* (2013.01); *G06K 9/00013* (2013.01); *G06K 9/00087* (2013.01)

(58) Field of Classification Search
CPC .......... G06K 9/00926; G06K 9/00013; G06K 9/00087; G06K 9/6212; G06K 9/00912; G06K 9/0004
See application file for complete search history.

(56) References Cited

U.S. PATENT DOCUMENTS

| 2007/0014443 | A1* | 1/2007 | Russo | ................ G06K 9/00906 382/124 |
| 2014/0044338 | A1  | 2/2014 | Coleman | |
| 2016/0321494 | A1* | 11/2016 | Shin | ........................ G06F 21/32 |

(Continued)

FOREIGN PATENT DOCUMENTS

TW        200709072 A        3/2007

*Primary Examiner* — Abhishek Sarma
(74) *Attorney, Agent, or Firm* — Muncy, Geissler, Olds & Lowe, P.C.

(57) ABSTRACT

The present invention relates to a fingerprint enrollment method and an electronic device for performing the fingerprint enrollment method. A fingerprint sensor of the electronic device senses the fingerprint to generate the fingerprint images. The processor of the electronic device determines if M qualified fingerprint images are acquired or the number of times the finger touches the fingerprint sensor reaches N. When any of the above conditions is satisfied, the operation of sensing fingerprint is stopped. After that, the processor uses the fingerprint images to generate fingerprint enrollment information to complete the fingerprint enrollment process. Based on the disclosure of the present invention, the user can complete the fingerprint enrollment process regardless of whether the user uses spiral enrollment or pressing enrollment.

25 Claims, 11 Drawing Sheets

(56) References Cited

U.S. PATENT DOCUMENTS

2017/0076132 A1\* 3/2017 Sezan .................... G06F 21/32
2018/0032792 A1\* 2/2018 Wang ................ G06K 9/00087
2020/0125710 A1\* 4/2020 Andersson ........ G06K 9/00114

\* cited by examiner

FINGERPRINT ENROLLMENT METHOD AND ELECTRONIC DEVICE USING THE FINGERPRINT ENROLLMENT METHOD

CROSS REFERENCE TO RELATED APPLICATIONS

This application claims the benefit of U.S. Provisional Application No. 62/674,631 filed on May 22, 2018 and Provisional Application No. 62/696,862 filed on Jul. 12, 2018 the contents of which are incorporated herein by reference.

BACKGROUND OF THE INVENTION

1. Field of the Invention

The present invention relates to a biological characteristics enrollment method, and particularly relates to a fingerprint enrollment method.

2. Description of the Prior Art

Fingerprint recognition is one of the common technologies for user identification used in current electronic devices. For such method, a user must enroll the fingerprint of at least one finger in the electronic device in advance. When identity recognition is required (e.g. unlocking an electronic device, executing a particular application, using a particular function . . . etc.), the electronic device senses the user's fingerprint and compares it with the enrolled fingerprint to identify the user.

According to the conventional fingerprint enrollment method, the user can only input the fingerprint by a specific method. A common fingerprint enrollment method is pressing enrollment, which needs the user to use different parts of the finger to press the fingerprint sensor multiple times to acquire multiple fingerprint images, which are processed as fingerprint enrollment information. A fingerprint image is generated for each time pressing. Accordingly, the fingerprint enrollment method using pressing enrollment always takes much time, but it is still the most popular and commonly used method.

SUMMARY OF THE INVENTION

The present invention provides a fingerprint enrollment method that allows a user to perform fingerprint enrollment in different ways.

In order to achieve the above object, the present invention provides a fingerprint enrollment method for sensing a fingerprint via a fingerprint sensor to generate fingerprint images. The method comprises the following steps: a. determining if M qualified fingerprint images are acquired; b. determining if a number of times that the finger touches the fingerprint sensor reaches N; and c. after the step a and the step b, stopping sensing the fingerprint by the fingerprint sensor if determination of the step a or the step b is yes, wherein the M and the N are positive integers larger than 1.

The present invention further provides an electronic device comprising: a fingerprint sensor, configured to sense a s fingerprint to acquire fingerprint images; and a processor, coupled to the fingerprint sensor, configured to perform following steps: a. determining if M qualified fingerprint images are acquired; b. determining if a number of times that the finger touches the fingerprint sensor reaches N; and c. after the step a and the step b, stopping sensing the fingerprint by the fingerprint sensor if determination of the step a or the step b is yes, wherein the M and the N are positive integers larger than 1.

One of the advantages of the present invention is that, by determining the two different fingerprint enrollment completion conditions, the user can complete the fingerprint enrollment process regardless which one of the spiral enrollment or the press enrollment is used, thereby effectively improving the convenience in use.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Please note the components in each embodiment can be implemented by hardware (e.g. circuit or device), and can implemented by firmware (e.g. processor installed with at least one program).

Figure 1:
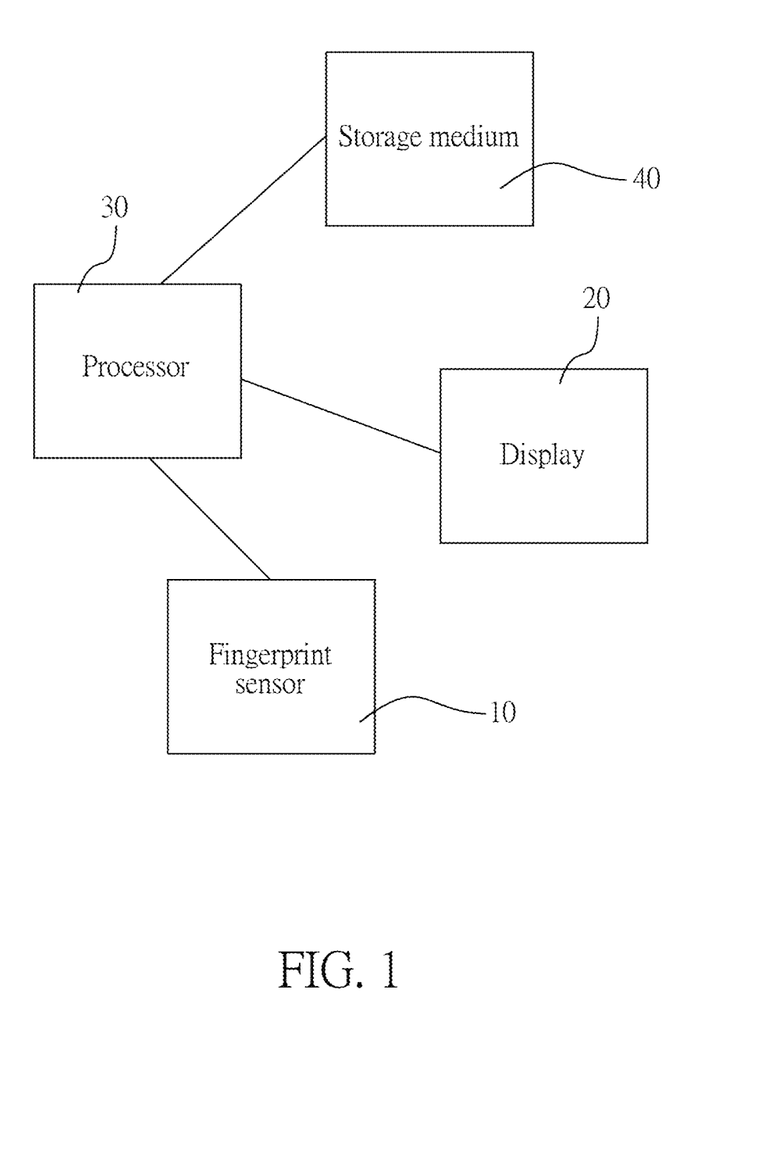
FIG. 1 is a block diagram illustrating an electronic device according to the present invention.

As shown in FIG. 1, according to one embodiment of the present invention, an electronic device comprises a fingerprint sensor 10, a display 20, a processor 30, and a storage medium 40 storing the codes that the processor 30 requires to perform the fingerprint enrollment process. The processor 30 is coupled to the fingerprint sensor 10, the display 20, and the storage medium 40. The fingerprint sensor 10 is configured to sense the fingerprint of a finger and has a size smaller than the finger. For example, the size of the fingerprint sensor 10 can be 6 mm*6 mm to 12 mm*12 mm while the finger size is about 20 mm*20 mm. The fingerprint sensor 10 can be optical sensor or capacitive sensor, which can both be applied to the present invention.

Figure 2A:
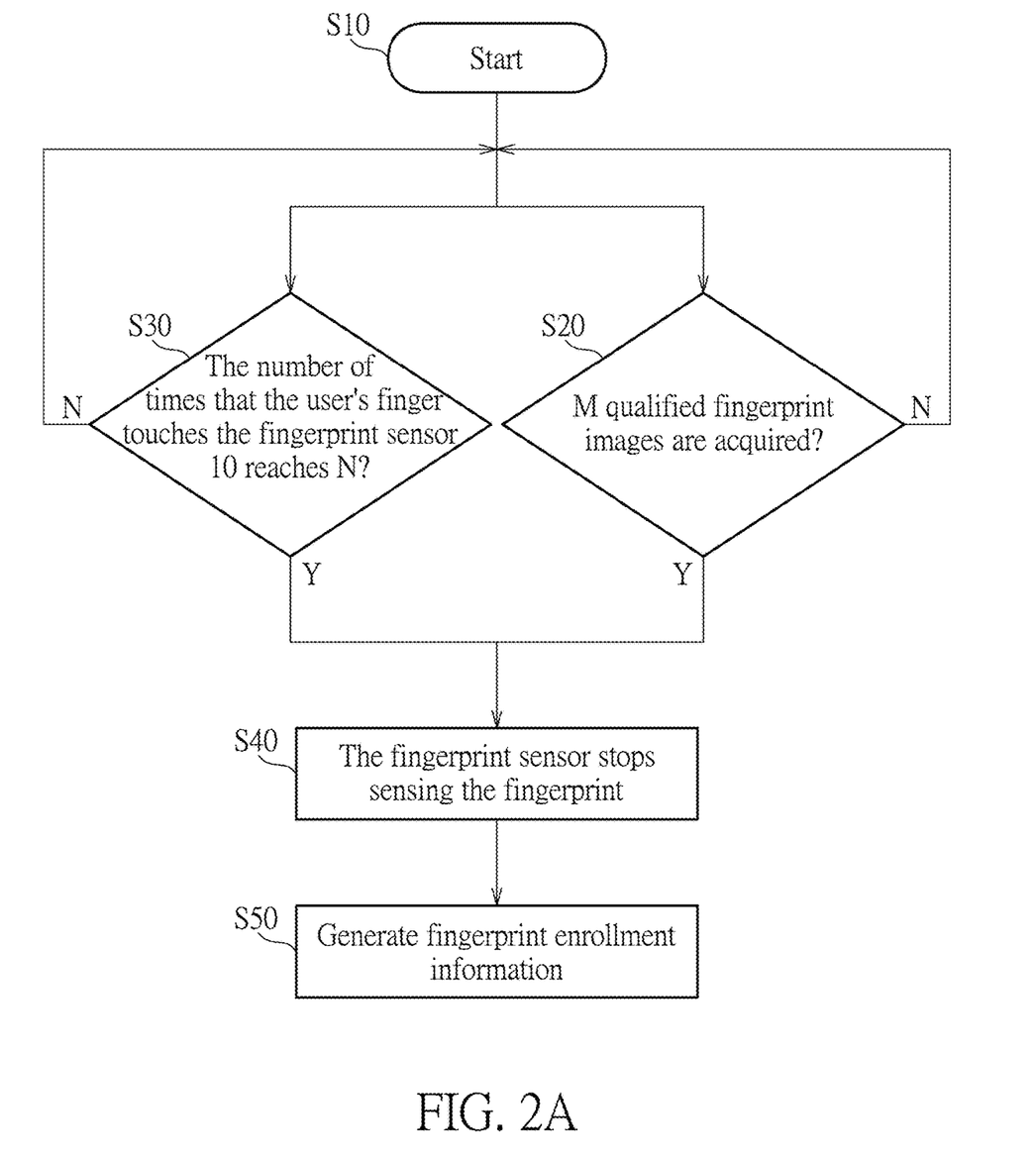
FIG. 2A is a flow chart according to one embodiment of the present invention.

FIG. 2A provides an embodiment of a fingerprint enrollment method according to the present invention. The process for fingerprint enrollment starts in Step S10. During the fingerprint enrollment process, a user inputs a fingerprint of a finger via the fingerprint sensor 10. The fingerprint sensor 10 senses the finger to acquire a plurality of fingerprint images, and transmits the fingerprint images to the processor 30. In step S20, the processor 30 determines if M qualified fingerprint images are acquired. A qualified fingerprint image is used to generate fingerprint enrollment information, and an unqualified fingerprint image is discarded. If the determination in step S20 is YES, step S40 is performed such that the fingerprint sensor 10 stops sensing the fingerprint. If the determination of step S20 is NO, step S20 is repeated. In step S30, the processor 30 determines if the number of times that the user's finger touches the fingerprint sensor 10 reaches N. If the determination in step S30 is YES, the process proceeds to step S40. If the determination of step S30 is NO, step S30 is repeated. The above M and N are positive integers greater than 1, and in one embodiment, M is greater than or equal to N.

After step S40, the process proceeds to step S50, and the processor 30 generates fingerprint enrollment information according to the qualified fingerprint images. In one embodiment, a qualified fingerprint image is processed by the algorithm of processor 30 to generate a piece of fingerprint enrollment information. Based on the M qualified fingerprint images, the processor 30 generates M pieces of fingerprint enrollment information.

When the determination of step S20 or S30 is YES, it means that the fingerprint enrollment has been completed, so the fingerprint sensor 10 can stop sensing the fingerprint. The processor 30 generates fingerprint enrollment information based on the fingerprint images that has been determined as qualified.

In one embodiment, when step S10 is performed, or before step S10 is performed, an instruction may be provided to instruct the user to move the finger on the fingerprint sensor 10 in a spiral path when performing fingerprint enrollment. In one embodiment, the instruction is a visible instruction. When the electronic device performs the fingerprint enrollment operation, the processor 30 provides the instruction to the display 20, and controls the display 20 to display the instruction. Following describes various methods of displaying the instruction, but not limited thereto. In other embodiments, the instruction can also be an audio instruction.

Figure 3:
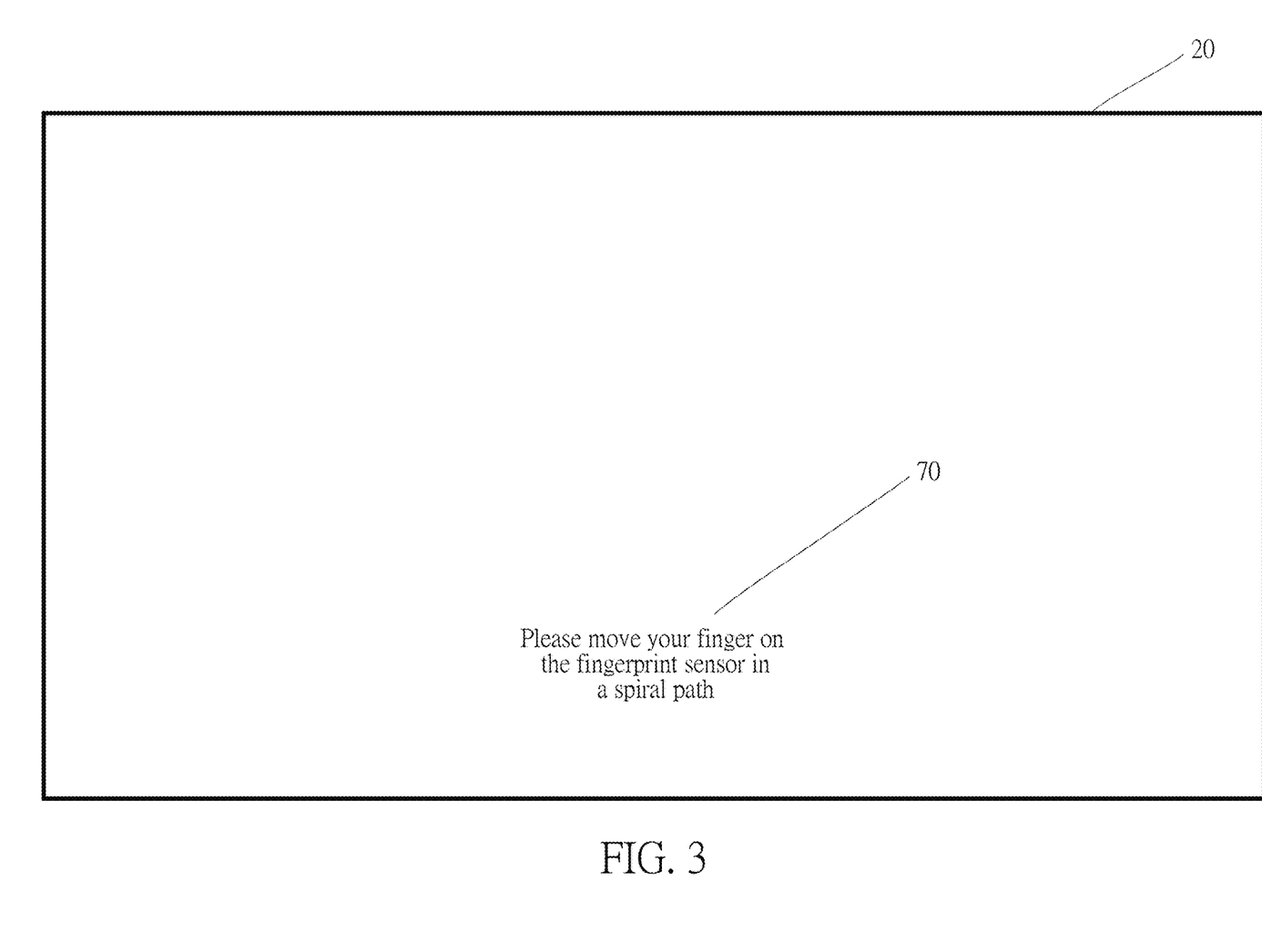
FIG. 3 is a schematic diagram illustrating an instruction according to a first embodiment of the present invention.

In the embodiment shown in FIG. 3, the instruction is a set of texts 70 which is displayed on the display 20. The contents of the set of texts 70 may be, for example, "Please move the finger in a spiral path on the fingerprint sensor".

Figure 4:
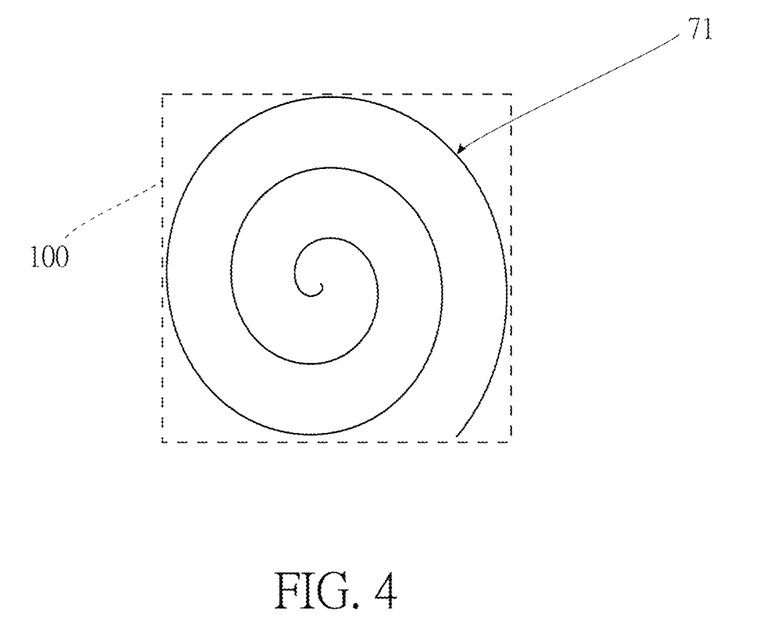
FIG. 4 is a schematic diagram illustrating an instruction according to a second embodiment of the present invention.

Please refer to FIG. 4, in one embodiment, the instruction is a spiral curve 71 displayed on the display 20 to prompt the user to move the finger following the spiral curve 71. In one embodiment, the schematic fingerprint sensor location 100 can be displayed on the display 20.

In other embodiments, the instruction comprises a spiral curve and a direction mark. The direction mark is used to indicate that the direction of the spiral curve is from an inside to an outside or from the outside to the inside, to prompt the user a moving direction of the finger. For example, the instruction 720 shown in FIG. 5 comprises a spiral curve 72 and a direction mark 724. The direction mark 724 is an arrow located at one end of the spiral curve 72. The direction mark 724 is used to indicate that the inside end 721 of the spiral curve 72 is the starting point, and the outside end 722 of the spiral curve 72 is the end point. Alternatively, the instruction 730 shown in FIG. 6 comprises a spiral curve 73 and a direction mark 734. The direction mark 634 is located at one end of the spiral curve 73. The direction mark 734 is an arrow indicating that the outside end 732 of the spiral curve 73 is the starting point, and the inside end 731 of the spiral curve 73 is the end point.

Figure 5:
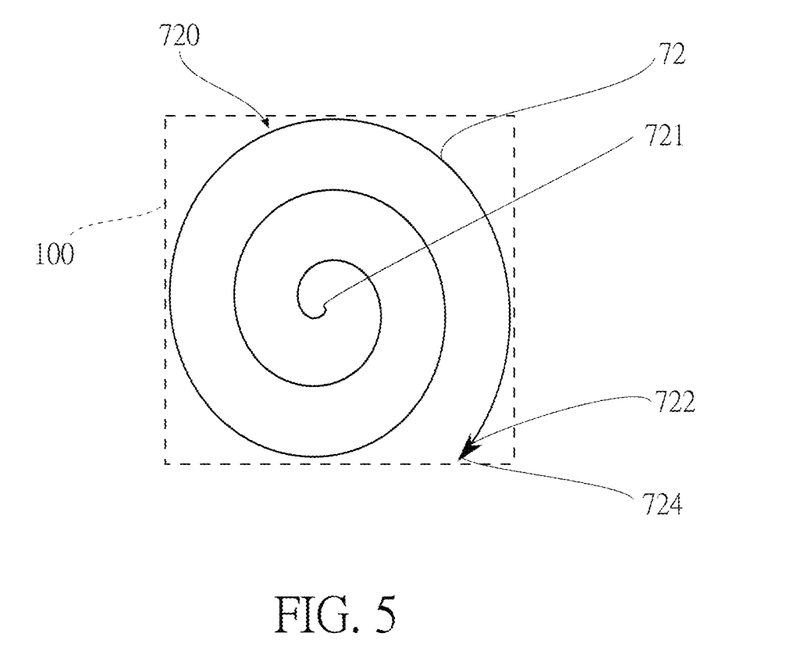
FIG. 5 is a schematic diagram illustrating an instruction according to a third embodiment of the present invention.
Figure 6:
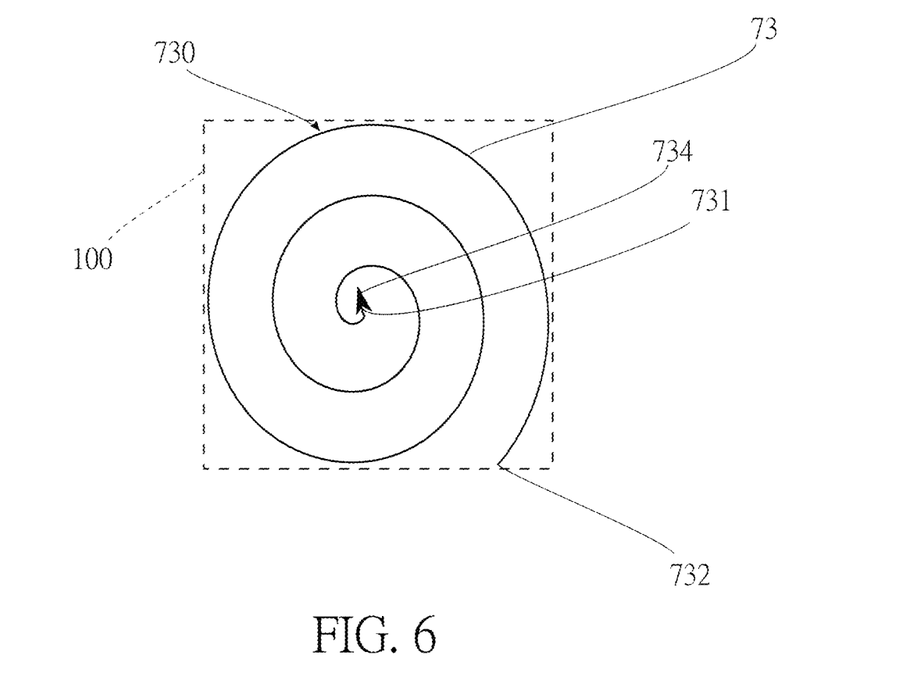
FIG. 6 is a schematic diagram illustrating an instruction according to a fourth embodiment of the present invention.

In FIG. 5, the direction of the instruction 720 is clockwise. Also, in the embodiment shown in FIG. 7, the direction of the instruction 740 is counter-clockwise.

Figure 7:
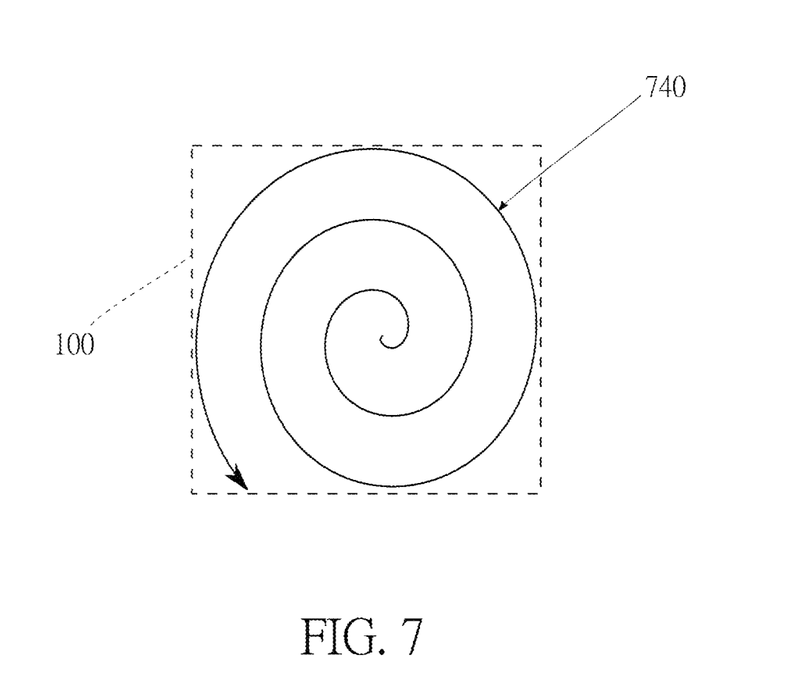
FIG. 7 is a schematic diagram illustrating an instruction according to a fifth embodiment of the present invention.
Figure 8A:
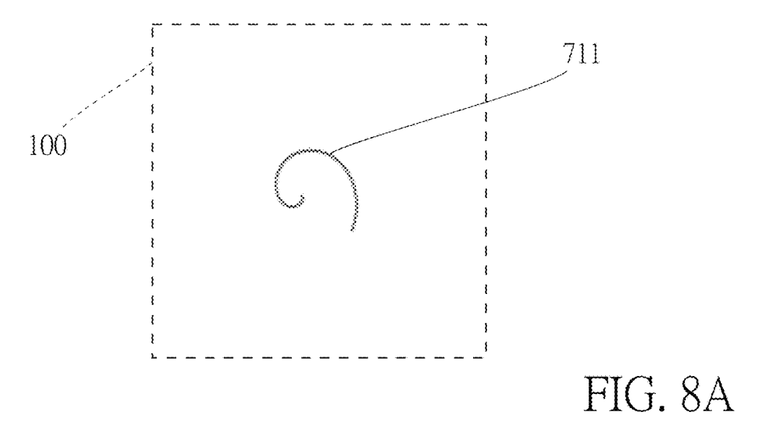
FIG. 8A, FIG. 8B and FIG. 8C are schematic diagrams illustrating a displayed instruction according to a first embodiment of the present invention.
Figure 8B:
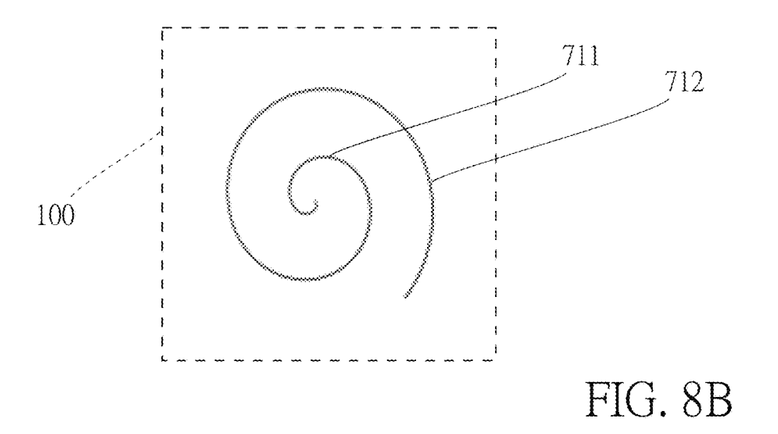
Figure 8C:
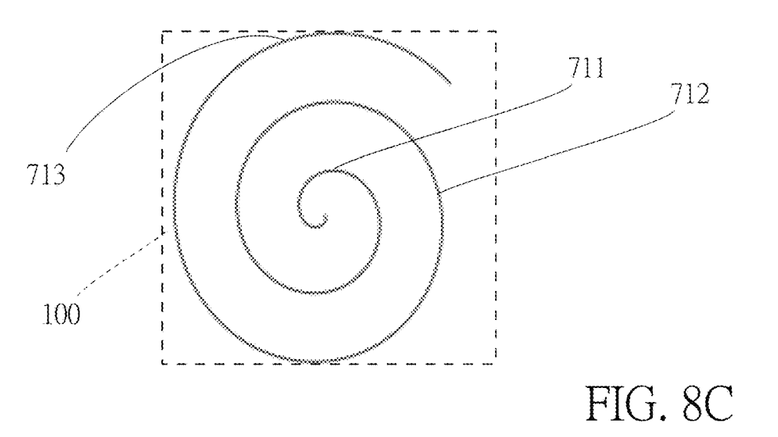

In other embodiments, the instruction is an animation. Taking the spiral curve 71 shown in FIG. 4 as an example, the display 20 displays the instruction by displaying the spiral curve 71 from an inside to an outside or by displaying the spiral curve 71 from the outside to the inside. As shown in FIG. 8A to FIG. 8C, when displaying the spiral curve 71, the spiral curve 71 is displayed from an inside to an outside. For example, first, the first line segment 711 is displayed as shown in FIG. 8A, and then the first line segment 711 and the second line segment 712 are displayed as shown in FIG. 8B, and then the first line segment 711, the second line segment 712, and the third line segment 713 are displayed as shown in FIG. 8C, and finally the complete spiral curve 71 is displayed, as shown in FIG. 7.

Figure 9A:
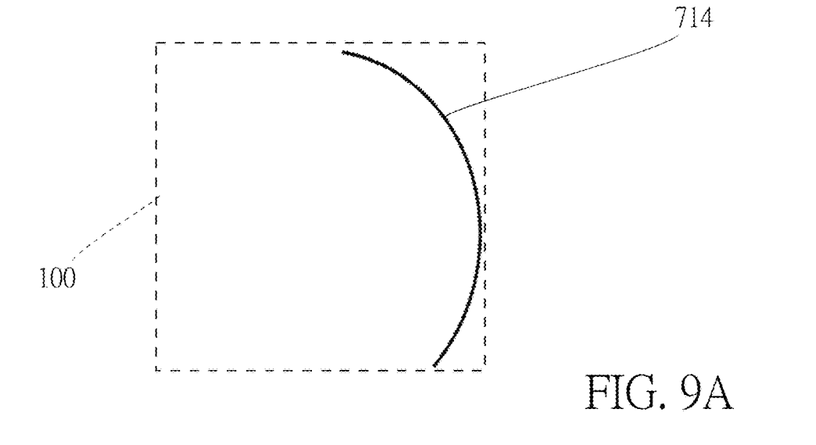
FIG. 9A, FIG. 9B and FIG. 9C are schematic diagrams illustrating a displayed instruction according to a second embodiment of the present invention.
Figure 9B:
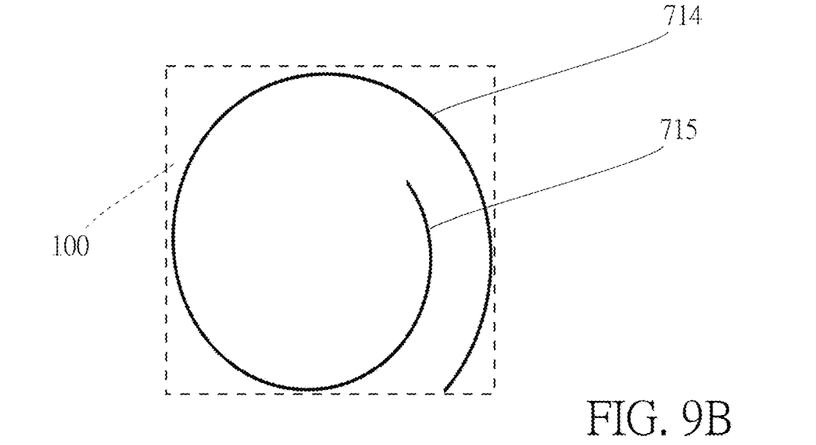
Figure 9C:
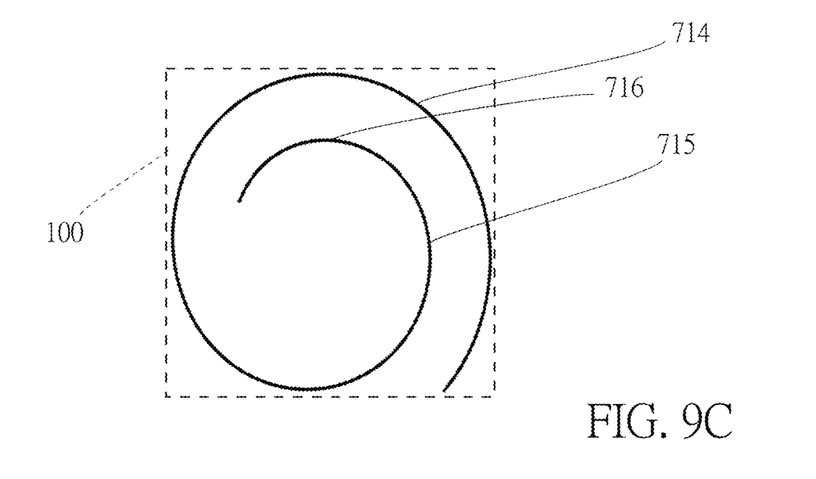

Please refer to FIG. 9A to FIG. 9C with FIG. 4, to understand the contents of another embodiment, in which the display 20 displays the spiral curve 71 from an outside to an inside when displaying the spiral curve 71. For example, first, the fourth line segment 714 is displayed as shown in FIG. 9A, then the fourth line segment 714 and the fifth line segment 715 are displayed as shown in FIG. 9B, and then the fourth line segment 714, the fifth line segment 715, and the sixth line segment 716 are displayed as shown in FIG. 9C, and finally the complete spiral curve 71 is displayed as shown in FIG. 4.

Figure 10:
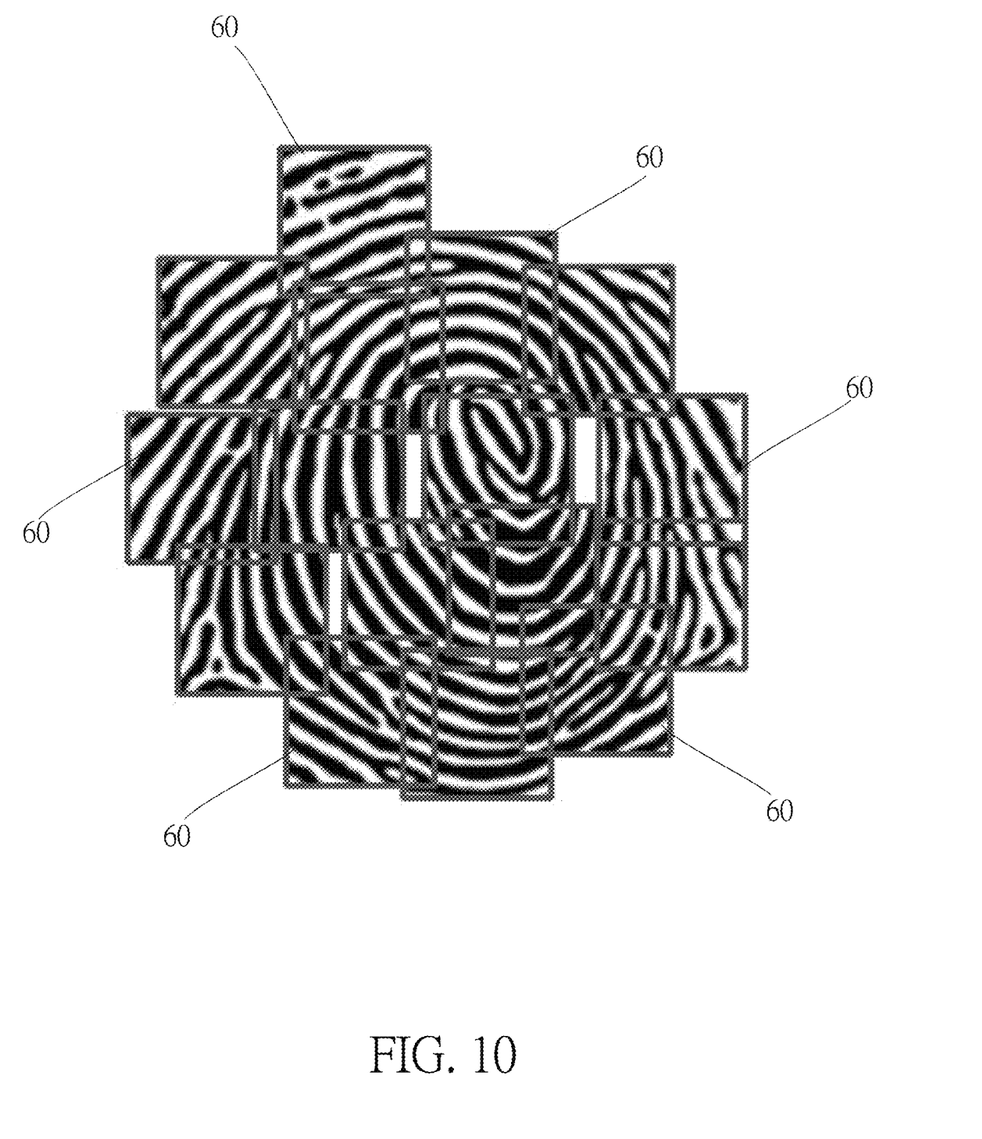
FIG. 10 is a schematic diagram illustrating a fingerprint image acquired by spiral enrollment.
Figure 11:
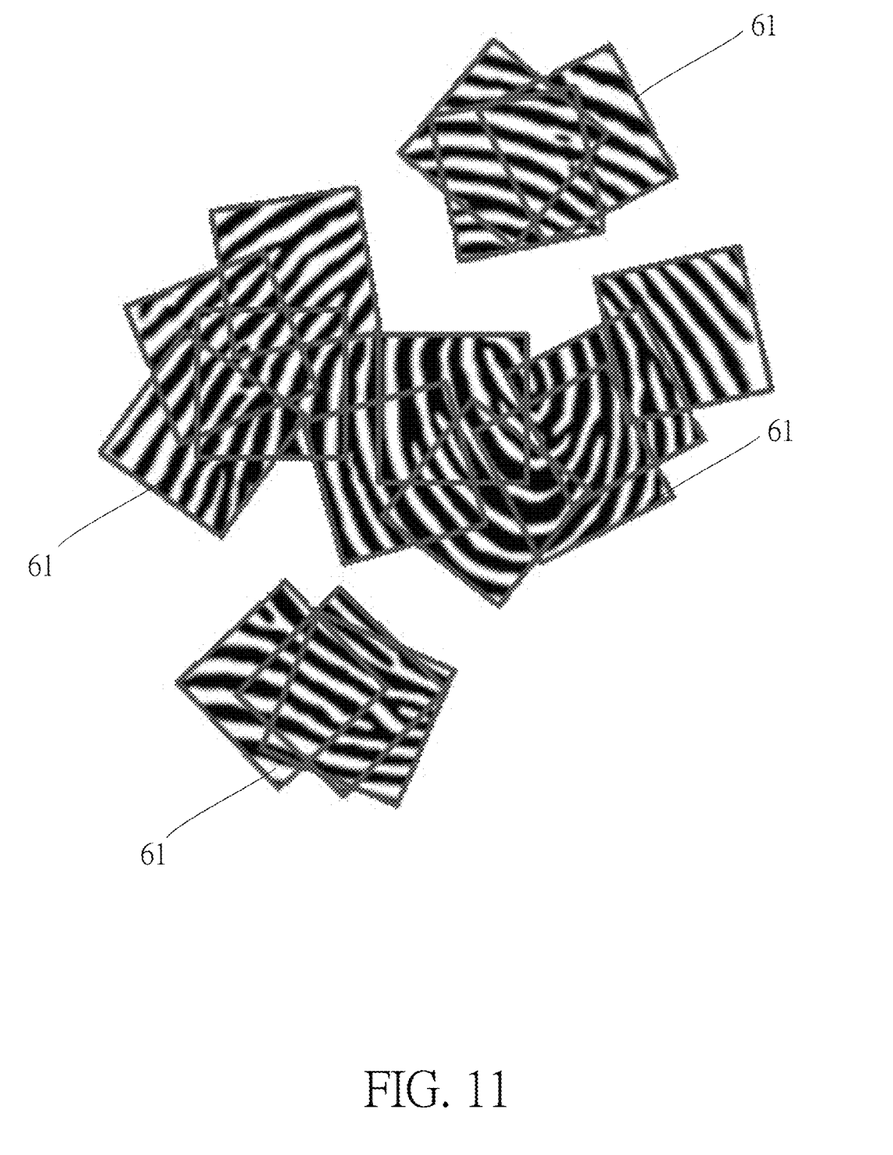
FIG. 11 is a schematic diagram illustrating a fingerprint image acquired by pressing enrollment.

Since the size of the fingerprint sensor 10 is smaller than the finger, the fingerprint image is an image of apart of the complete fingerprint of the finger. If the user follows above instruction to move the finger on the fingerprint sensor 10 in a spiral path, the fingerprint sensor 10 senses the finger multiple times during the movement of the finger on the fingerprint sensor 10. Thereby a plurality of fingerprint images 60 can be acquired, as shown in FIG. 10. If the user uses pressing enrollment, the user's finger needs to touch the fingerprint sensor 10 and leave the fingerprint sensor 10 multiple times. Each time the finger touches the fingerprint sensor 10, the fingerprint sensor 10 senses the finger 50 to acquire a fingerprint image. Therefore, when the user uses the pressing enrollment process, the fingerprint sensor 10 senses the finger multiple times and acquires a plurality of fingerprint images 61 as shown in FIG. 11.

According to the method of the present invention, when the processor 30 determines that the M quailed fingerprint images are acquired or the number of times that the finger touches the fingerprint sensor 10 reaches N, the fingerprint sensor 10 stops sensing the fingerprint. If the fingerprint enrollment method used by the user is moving the finger on the fingerprint sensor 10 in a spiral path, the processor 30 will first determine that the M qualified fingerprint images have been acquired (i.e. the determination in step S30 is YES) and then ends the enrollment process. When the user uses the pressing enrollment method, the processor 30 may first determine that the number of times that the finger touches the fingerprint sensor 10 reaches N and then ends the enrollment process. Therefore, for the user, the fingerprint enrollment process can be successfully completed regardless of which method is used to input the fingerprint. In other words, the method provided by the present invention is applicable to at least two types of fingerprint enrollment methods, and the user can perform the fingerprint enrollment process according to his or her habits or preferences. Therefore, the present invention can provide a better user experience.

Figure 2B:
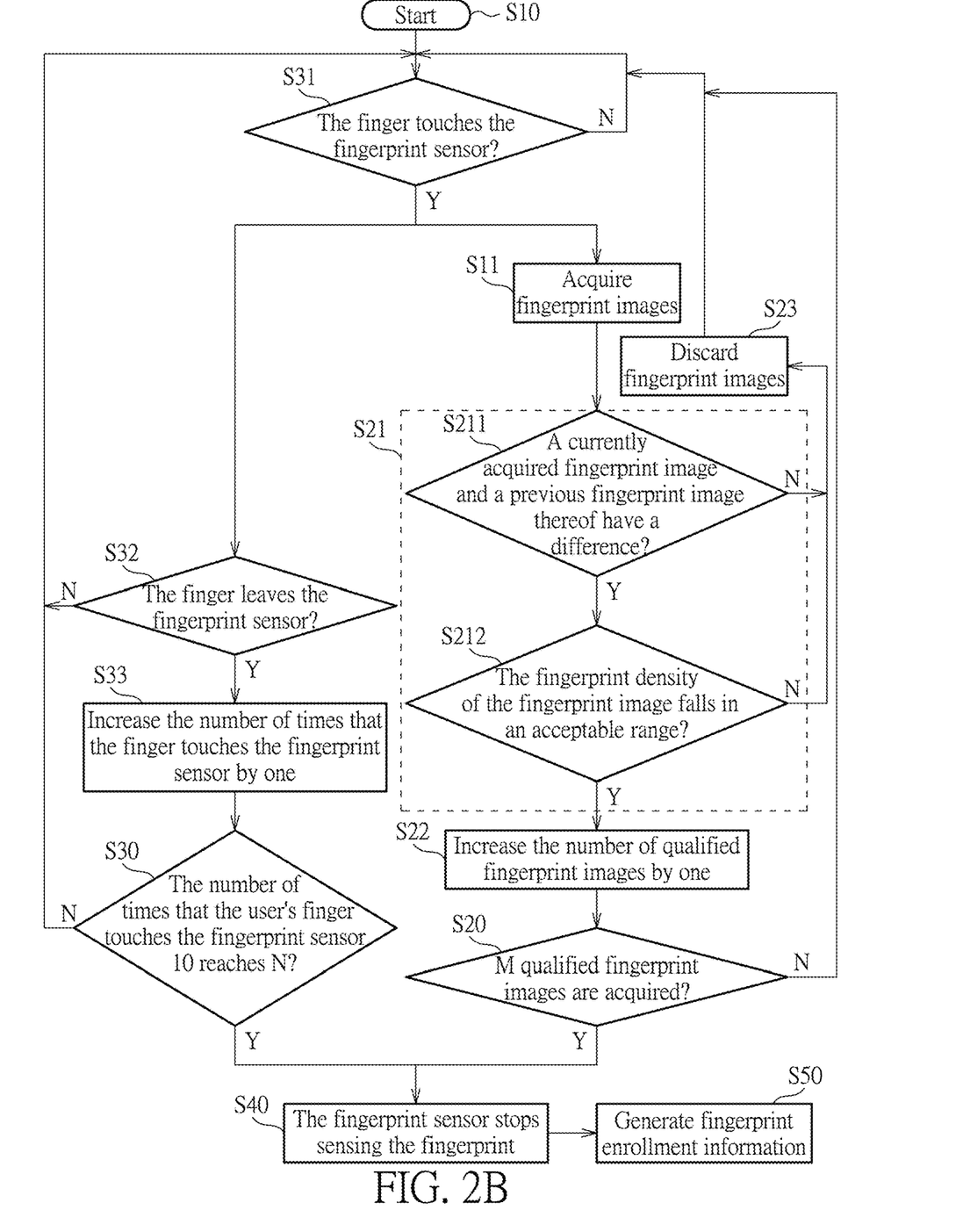
FIG. 2B is a flow chart according to another embodiment of the present invention.

FIG. 2B provides another embodiment of the present invention in which further comprise a plurality of steps in addition to steps S30 and S20. After the process of fingerprint enrollment is started in step S10, the process proceeds to step S31. Step S31 determines if the finger touches the fingerprint sensor 10. In one embodiment, the fingerprint sensor 10 is a capacitive fingerprint sensor comprising a sensing array having 80 X-direction sensing electrodes and 80 Y-direction sensing electrodes. According to the sensing amount of at least one of the sensing electrodes (for example, two X-direction sensing electrodes or two Y-direction sensing electrodes), it can be determined if a finger touches the fingerprint sensor 10. When a finger touches the fingerprint sensor 10, the voltage level of an I/O (input/output) contact of the fingerprint sensor 10 is pulled from a low voltage level to a high voltage level. By this way, the processor 30 can know that a finger touches the fingerprint sensor 10 according to the voltage level of the I/O contact, and then requiring the fingerprint sensor 10 to perform fingerprint sensing to acquire a fingerprint image.

After step S31 determines that no finger touches the fingerprint sensor 10, step S31 is performed again to continuously detect if a finger touches the fingerprint sensor 10. When step S31 determines that a finger touches the fingerprint sensor 10, steps S11 and S32 are respectively performed. In step S11, the processor 30 requires the fingerprint sensor 10 to sense the user's finger to acquire a fingerprint image. The fingerprint image sensed by the fingerprint sensor 10 is transmitted to the processor 30 to perform step S21.

Step S32 determines if the finger leaves the fingerprint sensor 10. In one embodiment, the processor 30 determines if the finger leaves based on the image transmitted from the fingerprint sensor 10. For example, the image generated by the fingerprint sensor 10 comprises 80×80 (i.e. 6400) sensing values (or pixel values), and the processor 30 compares the sum of the 6400 sensing values with a threshold value. If the sum is below the threshold, it means that the finger has left the fingerprint sensor 10.

If step S32 determines that the finger does not leave the fingerprint sensor 10, the process returns to step S31 to continuously detect if the finger still contacts the fingerprint sensor 10. As shown in the flowchart of FIG. 2B, each time the finger is determined to contact with the fingerprint sensor 10, the fingerprint sensor 10 senses the finger to capture the fingerprint image. Therefore, each time the finger touches the fingerprint sensor 10, the fingerprint sensor 10 generates more than one fingerprint images. The longer the finger touches the fingerprint sensor 10, the more fingerprint images the fingerprint sensor 10 generates. When step S32 determines the finger leaves the fingerprint sensor 10, step S33 is performed. In step S33, the processor 30 increases the number of times that the finger touches the fingerprint sensor by one. Step S33 counts a number of times that the fingerprint sensor 10 is touched from the starting of the fingerprint enrollment process. In step S30, the processor 30 determines if the number of times the finger touches the fingerprint sensor reaches N according to the counting result of step S33. If the determination in step S30 is YES, the process proceeds to step S40. In step S40, the fingerprint sensor 10 stops sensing the fingerprint. In one embodiment, when the processor 30 determines the number of times that the finger touches the fingerprint sensor reaches N, the processor no longer requires the fingerprint sensor 10 to sense the fingerprint, so that the fingerprint sensor 10 stops sensing the fingerprint. If the determination of the step S30 is NO, the process returns to the step S31 to continuously detecting if the finger touches the fingerprint sensor 10.

In step S21, the processor 30 determines if the fingerprint image acquired in step S11 is qualified. When the fingerprint image is determined as qualified, the process proceeds to step S22, to increase the number of qualified fingerprint images by one. When the fingerprint image is determined to be non-qualified, the process proceeds to step S23, the fingerprint image is discarded, and the process returns to step S31 to continuously determine if the finger touches the fingerprint sensor 10. In the embodiment shown in FIG. 2B, step S21 comprises steps S211 and S212. Step S211 determines if a currently acquired fingerprint image and a previous fingerprint image are different. One embodiment of step S211 comprises an operation of subtracting a fingerprint image from its previous fingerprint image. For example, the size of the fingerprint image is 80*80 pixels. The method for determining if the P-th fingerprint image and the previous one thereof (i.e. the P-1th fingerprint image) are different comprises firstly converting the two fingerprint images to values indicating each pixel, such as values 0~256. Next, the pixel values of the two fingerprint images are respectively subtracted to acquire 6400 (80*80) difference values, and the sum of the 6400 difference values is calculated. The sum of the difference values is used to compare with a sum threshold. When the sum of the difference values is greater than the sum threshold, it is determined that the two fingerprint images are different. In other embodiments, the above sum of difference values may also be divided by 6400 to acquire a difference average, and the difference average is compared with an average threshold. When the difference average is larger than the average threshold, it is determined that the two fingerprint images are different.

If the determination in step S211 is YES, the process proceeds to step S212. If the determination in step S211 is NO, the process proceeds to step S23, the fingerprint image is discarded, and the process returns to the step S31 to continuously determine if the finger touches the fingerprint sensor 10. In the process of enrolling the fingerprint, it is desired to acquire the fingerprint of all parts of the finger as much as possible. By step S211, it is possible to avoid storing a plurality of identical fingerprint images. If a fingerprint image and its previous fingerprint image are different, it means the fingerprint images correspond to different regions of the finger.

Step S212 determines if the fingerprint density D of the fingerprint image falls within an acceptable range. The fingerprint density D of the fingerprint image 60 can be calculated by various methods. In some embodiments, the fingerprint density D can be calculated according to the number of ridges or valleys covered by the two diagonal lines (or more lines) of the fingerprint image. Also, the fingerprint density D can be calculated according to the number that the ridge and the valley alternate. The acceptable range of the fingerprint density D can be determined according to the fingerprint density D1 of a first fingerprint image generated by the fingerprint sensor 10 sensing the finger. For example, if the fingerprint density D1 is 10, the acceptable range is a predetermined range of 10 (for example, 30% above and below, that is 7 to 13). In general, the rapid movement of the finger on the fingerprint sensor 10 tends to cause a deformed fingerprint image that cannot be used to generate fingerprint enrollment information. Since the fingerprint density of such deformed fingerprint image is low, the deformed fingerprint image can be excluded by determining if the density of the fingerprint image falls within an acceptable range.

If the determination in step S212 is YES, it means that the fingerprint image is qualified. Next, step S22 is performed. If the result of the determination in step S212 is NO, the fingerprint image is discarded in step S23, and the process returns to step S31 to continuously determine if the finger touches the fingerprint sensor 10. Step S22 counts a number of the qualified fingerprint images. Step S20 determines if M qualified fingerprint images have been acquired based on the counting result of step S22. In one embodiment, the processor 30 compares the number of the qualified fingerprint images with a predetermined value M to determine if the number of qualified fingerprint images reaches the predetermined value M. When the determination of step S20 is YES, the process proceeds to step S40. When the determination of step S20 is NO, the process returns to step S31 to continuously determine if the finger touches the fingerprint sensor.

Figure 2C:
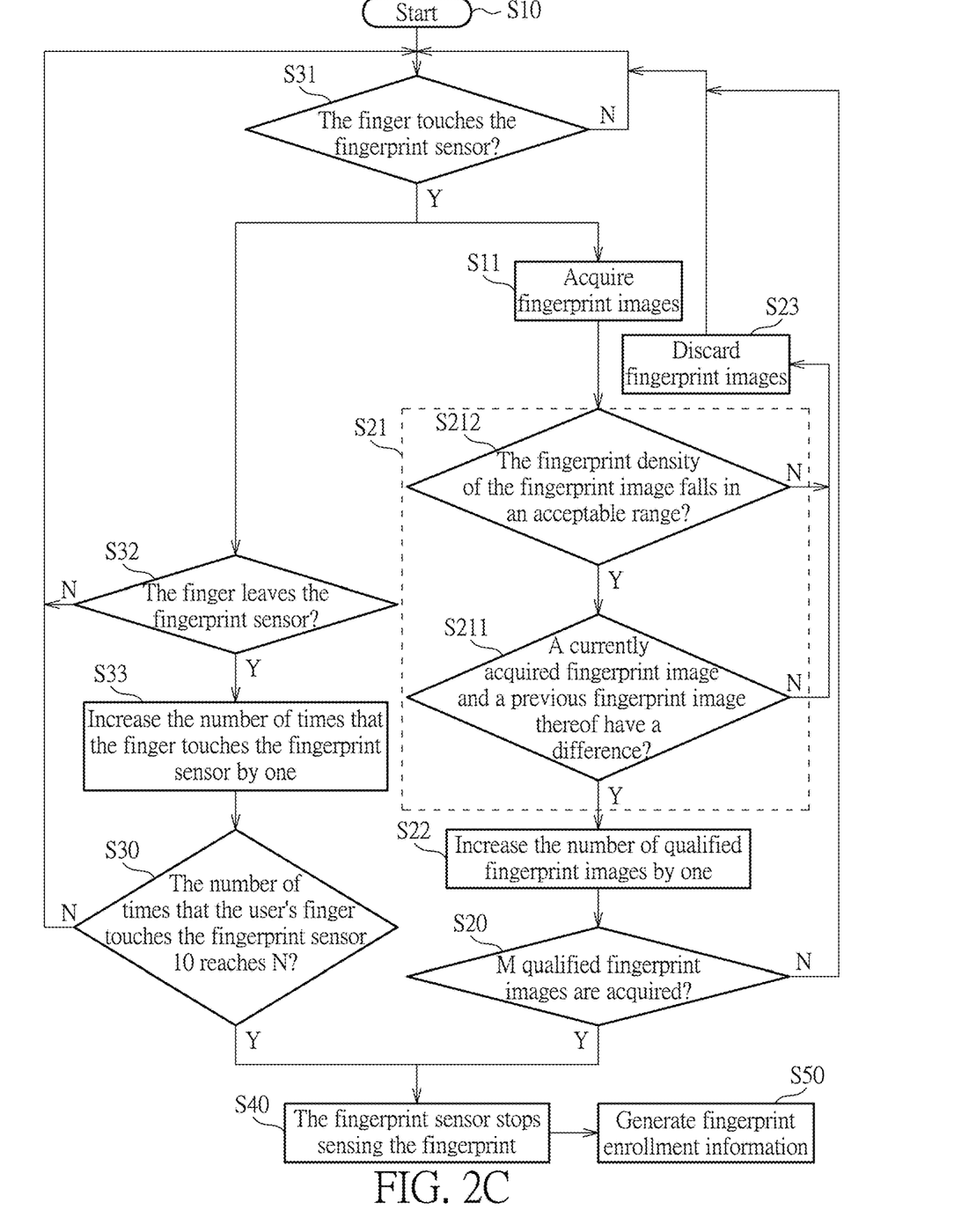
FIG. 2C is a flow chart according to still another embodiment of the present invention.

Step S21 in FIG. 2B is merely an embodiment and does not mean to limit the present invention. In other embodiments (as shown in FIG. 2C), the sequence of steps S211 and S212 can be exchanged. Also, step S21 may have more or less determining conditions. For example, step S21 may comprise only one of steps S211 and S212.

In the descriptions of the above embodiment, the fingerprint sensor 31 is used to sense the fingerprint and to determine if there is finger contact, and other steps are performed by the processor 30. The codes corresponding to the steps of FIG. 2B or FIG. 2C may be stored in the storage medium 40, and the processor 30 implements the steps by executing the codes in the storage medium 40. However, the invention is not intended to limit the hardware of the various steps. In other embodiments, if the fingerprint sensor 30 has a more powerful microprocessor, all the steps or the steps need calculating in FIG. 2A to FIG. 2C may also be performed by the fingerprint sensor 10.

The above descriptions are only embodiments of the present invention, and do not mean to limit the present invention in any way. Although the present invention has been disclosed in the above embodiments, it is not intended to limit the present invention. In the scope of the technical solutions of the present invention, any persons skilled in the art can make modifications or variation to the disclosed technique contents to form equivalent embodiments. Without departing from the technical scope of the present invention, it is still within the scope of the technical solution of the present invention to make any simple modifications, equivalent changes and modifications to the above embodiments.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device, comprising:
a fingerprint sensor, configured to sense a fingerprint to acquire fingerprint images; and
a processor, coupled to the fingerprint sensor, configured to perform following steps:
a. determining if M qualified fingerprint images are acquired;
b. determining if a number of times that the finger touches the fingerprint sensor reaches N;
c. after the step a and the step b, stopping sensing the fingerprint by the fingerprint sensor if determination of the step a or the step b is yes, wherein the M and the N are positive integers larger than 1;
d. determining if the fingerprint image generated by the fingerprint sensor is qualified;
e. counting a number of the qualified fingerprint images; and
f. counting the number of times that the finger touches the fingerprint sensor;
wherein the number in the step e is for determining of the step a, and the step d and the step e are repeated if the determination of the step a is no;
wherein the number in the step f is for determining of the step b.

2. The electronic device of claim 1, wherein a step of determining the fingerprint image is qualified in the step a performed by the processor comprises:
d1. determining a current fingerprint image and a previous fingerprint image are different.

3. The electronic device of claim 1, wherein a step of determining the fingerprint image is qualified in the step d performed by the processor comprises:
d2. determining a fingerprint density of the fingerprint image falls within an acceptable range.

4. The electronic device of claim 1, wherein the step f performed by the processor comprises increasing the number of times by one if the finger touches and leaves the fingerprint sensor.

5. The electronic device of claim 1, wherein the M is larger than or equal to the N.

6. The electronic device of claim 1, wherein the processor is further configured to perform a following step:
providing a first instruction prompting a user to move the finger on the fingerprint sensor in a spiral path.

7. The electronic device of claim 6, wherein the first instruction comprises at least a text.

8. The electronic device of claim 6, wherein the first instruction comprises a spiral curve.

9. The electronic device of claim 8, wherein the first instruction further comprises a direction mark which is used to indicate that a direction of the spiral curve is from an inside to an outside or from the outside to the inside, to prompt a direction of finger moving for the user.

10. The electronic device of claim 8, wherein a method of displaying the first instruction displays the spiral curve from an inside to an outside, or displays the spiral curve from the outside to the inside.

11. The electronic device of claim 6, further comprising a display coupled to the processor, wherein the processor provides the first instruction to the display and the display displays the first instruction.

12. The electronic device of claim 1, wherein if the finger moves on the fingerprint sensor in a spiral path, the M qualified fingerprint images are going to be acquired before the number of times that the finger touches the fingerprint sensor reaches N.

13. The electronic device of claim 1, wherein the fingerprint sensor generates more than one fingerprint images at each time that the finger touches the fingerprint sensor.

14. A fingerprint enrollment method, which senses a fingerprint by a fingerprint sensor to generate fingerprint images, comprising:
a. determining if M qualified fingerprint images are acquired;
b. determining if a number of times that the finger touches the fingerprint sensor reaches N;

c. after the step a and the step b, stopping sensing the fingerprint by the fingerprint sensor if determination of the step a or the step b is yes, wherein the M and the N are positive integers larger than 1 ;
d. determining if the fingerprint image generated by the fingerprint sensor is qualified;
e. counting a number of the qualified fingerprint images; and
f. counting the number of times that the finger touches the fingerprint sensor;
wherein the number in the step e is for determining of the step a, and the step d and the step e are repeated if the determination of the step a is no;
wherein the number in the step f is for determining of the step b.

15. The fingerprint enrollment method of claim 14, wherein a step of determining the fingerprint image is qualified in the step d comprises:
   d1. determining a current fingerprint image and a previous fingerprint image are different.

16. The fingerprint enrollment method of claim 14, wherein a step of determining the fingerprint image is qualified in the step d comprises:
   d2. determining a fingerprint density of the fingerprint image falls within an acceptable range.

17. The fingerprint enrollment method of claim 14, wherein the step f comprises increasing the number of times by one if the finger touches and leaves the fingerprint sensor.

18. The fingerprint enrollment method of claim 14, wherein the M is greater than or equal to the N.

19. The fingerprint enrollment method of claim 14, further comprising:
   providing a first instruction prompting a user to move the finger on the fingerprint sensor in a spiral path.

20. The fingerprint enrollment method of claim 19, wherein the first instruction comprises at least a text.

21. The fingerprint enrollment method of claim 19, wherein the first instruction comprises a spiral curve.

22. The fingerprint enrollment method of claim 21, wherein the first instruction further comprises a direction mark which is used to indicate that a direction of the spiral curve is from an inside to an outside or from the outside to the inside, to prompt a direction of finger moving for the user.

23. The fingerprint enrollment method of claim 21, wherein a method of displaying the first instruction displays the spiral curve from an inside to an outside, or displays the spiral curve from the outside to the inside.

24. The fingerprint enrollment method of claim 14, wherein if the finger moves on the fingerprint sensor in a spiral path, the M qualified fingerprint images are going to be acquired before the number of times that the finger touches the fingerprint sensor reaches N.

25. The fingerprint enrollment method of claim 14, wherein the fingerprint sensor generates more than one fingerprint images at each time that the finger touches the fingerprint sensor.

* * * * *